US005568550A

United States Patent [19]

Ur

[11] Patent Number: 5,568,550
[45] Date of Patent: Oct. 22, 1996

[54] METHOD AND SYSTEM FOR IDENTIFYING DOCUMENTS GENERATED BY AN UNAUTHORIZED SOFTWARE COPY

[75] Inventor: Shmuel Ur, 11 Ravina Street, Tel Aviv 69395, Israel

[73] Assignees: Shmuel Ur, Israel; Leon H. Charney, New York, N.Y.; Shay H. Bushinsky, Israel; a part interest

[21] Appl. No.: 318,218

[22] Filed: Oct. 5, 1994

[51] Int. Cl.$^6$ .................................................. H04L 9/00
[52] U.S. Cl. ...................... 380/3; 380/23; 380/52; 380/18; 380/4; 382/317; 283/92; 283/91
[58] Field of Search ..................... 380/3, 23, 52, 380/18, 4; 382/61; 283/92, 91

[56] References Cited

U.S. PATENT DOCUMENTS

| 4,184,700 | 1/1980 | Greenaway | 283/6 |
|---|---|---|---|
| 4,504,084 | 3/1985 | Jauch | 283/94 |
| 5,031,214 | 7/1991 | Dziewit et al. | 380/23 |
| 5,080,479 | 1/1992 | Rosenberg | 352/92 |
| 5,134,669 | 7/1992 | Keogh et al. | 382/61 |
| 5,140,650 | 8/1992 | Casey et al. | 382/61 |
| 5,149,140 | 9/1992 | Mowry, Jr. et al. | 283/93 |

*Primary Examiner*—David C. Cain
*Attorney, Agent, or Firm*—Richard V. Westerhoff; Eckert Seamans Cherin & Mellott

[57] ABSTRACT

Each copy of software is assigned a unique identifying code pattern which is printed on all documents produced with that software by a high resolution printer. The unique identifying code pattern is a plurality of spaced apart marks having a size no greater than about 300 dpi, and is therefore, at best, barely noticeable to the human observer. The "invisible signature" is also reproduced on documents made by unauthorized copies of software which can therefore be traced. Preferably, the unique identifying code is replicated multiple times over the document using an error correcting code to assure that at least one replication will be clear of matter selected for printing by the software. A high resolution scanner extracts and identifies the code patterns printed on the document. In systems where the software generates a print file for the high resolution printer, print commands for the pattern replications are interspersed with the other print commands making identification and removal of the commands very difficult and not worth the effort since the "invisible signature" does not prevent copying of the software or noticeably detract from the appearance of the finished document.

18 Claims, 3 Drawing Sheets

METHOD AND SYSTEM FOR IDENTIFYING DOCUMENTS GENERATED BY AN UNAUTHORIZED SOFTWARE COPY

BACKGROUND OF THE INVENTION

1. Field of the Invention

This invention relates to a method and system for software protection through identification of unauthorized copying of software. More particularly, it relates to tracking down unauthorized copies of software through identification of documents generated by the unauthorized software copy on which a unique identifying code is imprinted by a high resolution printer.

2. Background Information

Software piracy is one of the biggest problems facing the software industry. It is estimated that only about 40% Coy value) of the software in the United States is legal. That is only about 40% of the software has been purchased. The remainder is copied from legal software. As low as this may sound, it is a higher percentage of any other country. In Britain the estimate is that only about 20% of the software is legal. The Far East and Russia are known as one diskette countries, meaning that almost no legal software exists. According to a recent estimate, the cost to the software industry of piracy is $10–12 Billion a year.

Present techniques for protecting software are principally directed toward making it more difficult to copy the software. However, there is considerable consumer resistance to this approach, and computer hackers take great pride in meeting the challenge of defeating the lock. Other approaches such as placing a "time bomb" in the program which is activated if a license fee is not timely paid are also not received favorably by purchasers and can lead to possible liability for destroying a user's dam.

The software industry has recently tried to stem the tide of piracy through legal remedies. However, this is a costly and time-consuming approach, which generally requires access to the :host computer, and could backfire if suspicions turn out to be unfounded. Generally, legal redress is only suitable for large scale piracy.

There is a need, therefore, for an improved technique for protecting software from piracy.

There is a need for such a technique which does not require access to the host computer on which the software is run.

There is also a need for such a technique which is sufficiently secure that attempts to defeat it are discouraged.

There is an additional need for such a technique which allows identification of unauthorized software copies without noticeably affecting the performance of the software or even the ability to copy it, again, so that the incentive to by-pass the technique is minimized.

SUMMARY OF THE INVENTION

These needs and others are satisfied by the invention which is directed to uniquely identifying each authorized software copy by an essentially invisible signature applied to the documents generated by that software copy. In particular, the signature which is basically invisible to the unaided human eye, is a unique identifying code pattern which is imprinted on the document. The invention is designed to be used with a high resolution printer, which for the purposes of this application is defined as a printer having a resolution at least as great as about 300 dpi (dots per inch). The unique identifying code pattern is made up of non-contiguous marks, preferably single dots, generated by such a high resolution printer, however, when printers with a higher resolution are used, each mark may comprise multiple adjacent dots as long as they collectively constitute a mark having a size no greater than about 300 dpi.

The unique identifying code pattern is automatically applied to each document made by the software. Unauthorized copies of the software will also generate documents with the same unique identifying code pattern thereon. Printers commonly used today have at least 300 dpi resolution and some have resolutions of 600 or 1000 dpi. Even at 300 dpi, the non-contiguous marks constituting the invisible signature are barely visible and go unnoticed by the casual observer. Documents produced by software incorporating the invention, can be scanned with a high resolution scanner which extracts the unique identifying code pattern for identification. Documents produced by a party not having a licensed copy of the software thus can be traced.

The unique identifying code can be placed on the document in the an area in which the software application will typically not print. Preferably, however, multiple replications of the unique identifying code pattern are spaced across the document so that the likelihood is increased that the "invisible signature" will not be obscured by other matter printed on the document. Also, the signature should be imprinted using an error correcting code so that imperfections in the paper and "smears" of the printer will not affect it.

The invention embraces both a method and a system for printing a unique identifying code pattern on the document using a high resolution printer. In a broader respect, the invention is directed to a method of identifying a medium used to generate an image by employing the medium to generate an image incorporating the unique identifying code pattern; and scanning the image to extract and identify that pattern.

While the invention is only applicable to a medium which generates an image, such as software which :generates a document, it has many advantages over present techniques. It does not require access to the equipment which generated the document or image. It does not prevent full use, or even copying, of the software or medium. Preferably, in software which generates a print file containing commands for the printer, print commands for the unique identifying code pattern are interspersed in the print file which makes it very arduous and time-consuming to attempt to extract those commands. The incentive is clearly to discourage attempts to defeat the system which leaves the user of an unauthorized copy open to detection.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
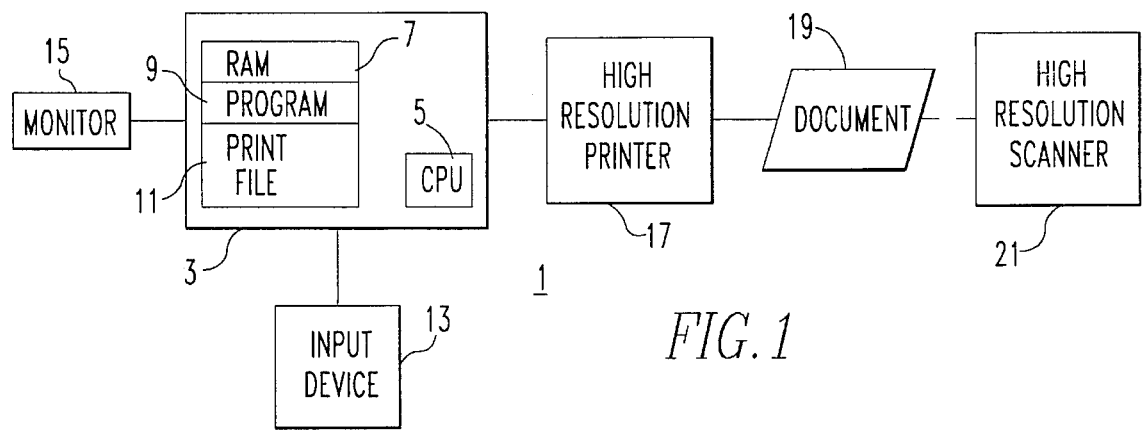
FIG. 1 is a schematic diagram in block form of a system for implementing the invention.

The invention will be described as applied to protecting software, for which it is particularly suitable. The software is utilized in the computerized document production system 1 illustrated in FIG. 1. This system includes a digital computer 3 which includes a central processing unit (CPU) 5 and random access memory (RAM) 7 which stores the software program 9 for use by the CPU 5, and a print file 11. The CPU 5 implements the program 9 in accordance with instructions entered by the user through an input device 13 which can include one or more of a keyboard, a mouse, a track ball or a touch screen, for instance. The program 9 to which the invention applies has the capability of generating a printed document. This can be in addition to a display generated on a monitor 15. In fact, it is not necessary that the program always generate a document, but only that it is capable of generating a printed document. A high resolution printer 17 generates the document 19 in accordance with the information provided to it by the computer 3. Typically, the computer generates the print file 11 which contains detailed commands to the printer of the matter to be printed on the document 19. This matter could be text, numeric, alphanumeric, a pictorial image or any other matter. By high resolution printer, is meant that the printer has resolution of at least 300 dots per inch (dpi). Currently available laser printers have at least this resolution and are also available with resolutions of 600 dpi and 1000 dpi. Also, it is not necessary that the computer generate a print file 11 for transmittal to the high resolution printer. Where the printer has its own software for generating the print instructions, the computer need only send to the printer the information to be printed.

As will be discussed in more detail, embedded in the printed document is a unique identifying code pattern assigned to the particular authorized copy of the software. The identity of the authorized owner can be recorded at the time of purchase of the software, or incentives can be provided to the purchaser to register the software after purchase such as by offering updates to the program only to those who register their name and address. The unique identifying code pattern is in essence a serial number or identifier for the authorized copy which becomes an invisible signature on the printed document 19.

While this "invisible signature" is not readily apparent to the casual observer of the document, and indeed with very high resolution printers may be imperceptible, the unique identifying code pattern can be extracted from the document 19 by a high resolution scanner 21. Such a scanner must have a resolution of at least as great as that of the printer. Scanners with such resolution are readily available, and in fact there are commercial models with resolutions as high as 2400 dpi.

Figure 2A:
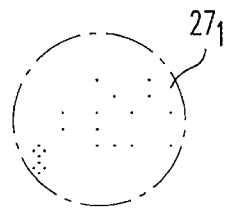
FIG. 2a is an enlargement of a section of FIG. 2.
Figure 2:
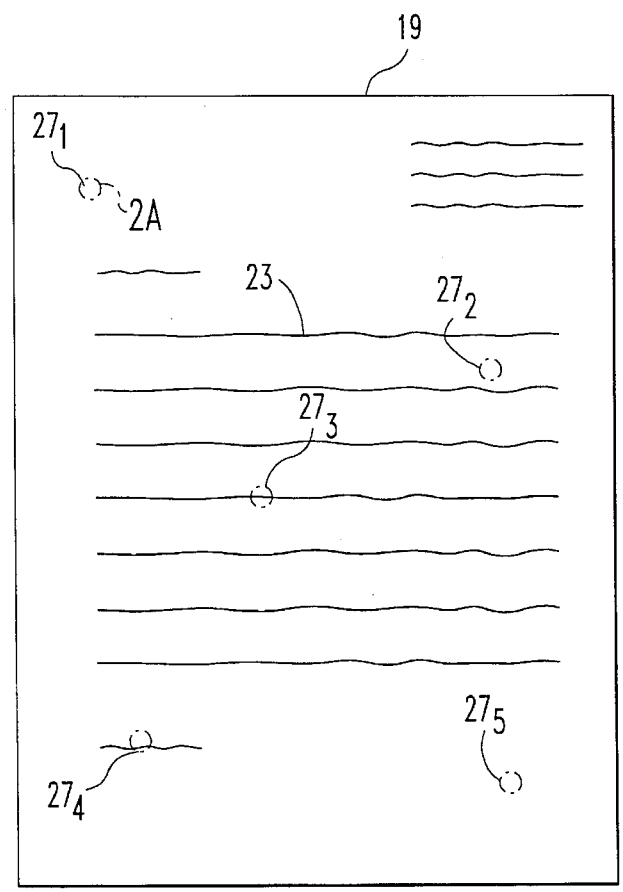
FIG. 2 is an illustration of a document generated by the system of FIG. 1 and incorporating a unique identifying code in accordance with the invention

FIG. 2 illustrates a document 19 generated by the system of FIG. 1 in accordance with the invention. The exemplary document 19 is a printed document with lines of text 23 surrounded by clear margins 25. The unique identifying code pattern 27 is printed on the document simultaneously with the text 23. A single pattern $27_1$ can be printed at a location where it will be clear of the text 23. However, where the program prints selected matter other than printed text, such as, for example an image, there is no guarantee that any area on the document will always be free of selected matter 23. Therefore, it is preferred that multiple replications $27_1$-$27_5$ be printed at spaced apart locations across the face of the document 19. The number of replications shown in FIG. 2 and their locations are exemplary only. It is within the contemplation of the invention that a wide variety of the number of replications and their locations could be utilized. The selection of the number of replications and their locations could also be a function of the particular application program, with the selection being made to maximize the number of replications likely to appear in clear space on the document. As can be seen in FIG. 2, some of the replications of the unique identifying code pattern such as $27_1$ and $27_5$ appear in the margins. Others such as $27_2$ appear in the field of the printed text but between lines so that they are not obscured by the text. Still others such as $27_3$ and $27_4$ are at least partially obscured by the matter 23 selected by the program for the image to be generated on the document.

The replication $27_1$ of the unique identifying pattern is shown magnified in FIG. 2a to illustrate that it is composed of a pattern of non-contiguous marks 29 each having a resolution at least as great as 300 dpi. Where the printer 17 is a 300 dpi printer, each of the marks 29 is a single dot. If a higher resolution printer is used, for instance, a 1000 dpi printer, each of the marks 29 may be formed by adjacent dots, just so that collectively they have a resolution at least as great as 300 dpi. Thus, for instance, for a 1000 dpi printer each of the marks 29 could be 1, 2, or 3 dots. Preferably, however, single dots with a higher resolution printer are used, such as, for example single dots at 1000 dpi, so that the unique identifying code pattern 27 is imperceptible to the human eye, but can be read by a scanner 21 with at least a 1000 dpi resolution.

Figure 3:
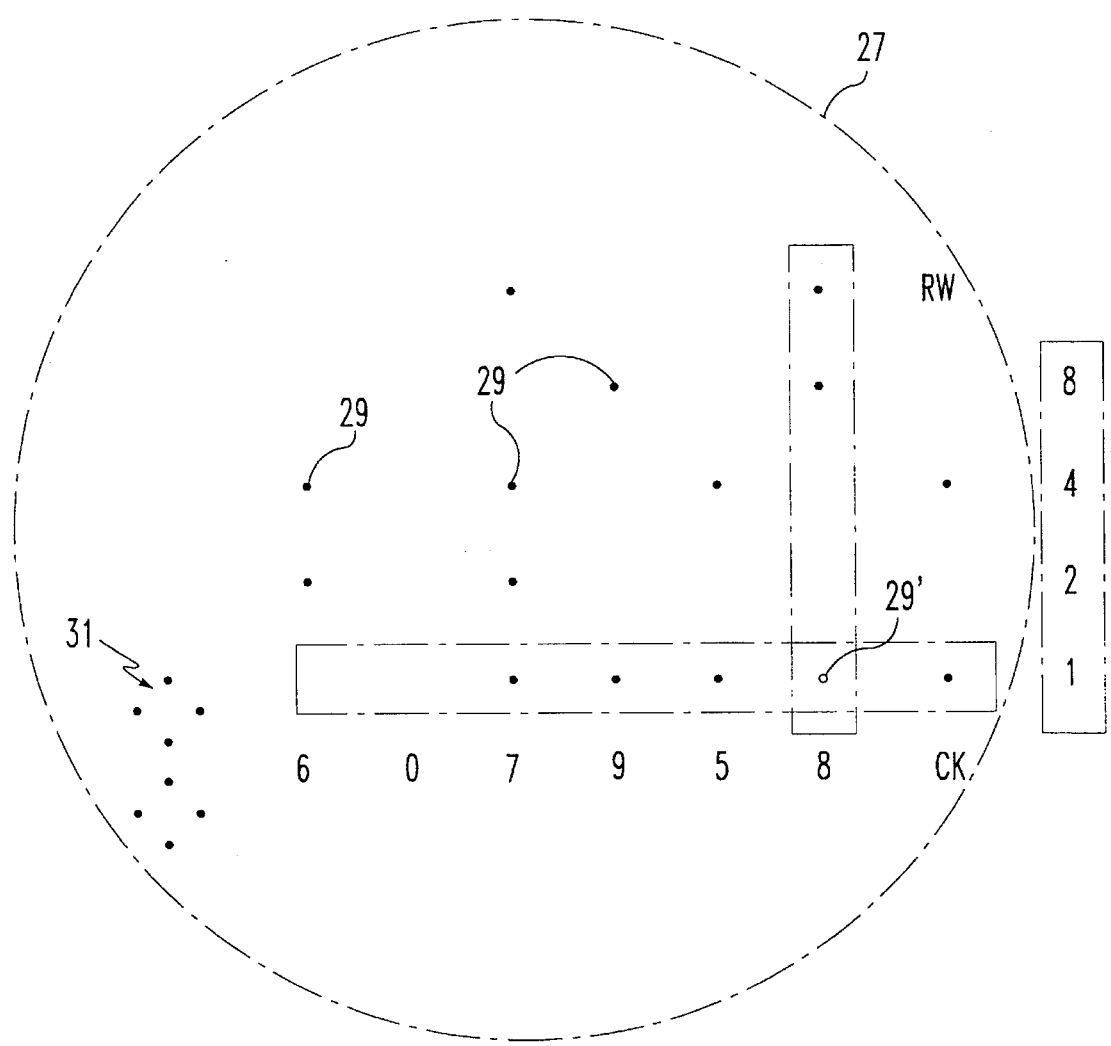
FIG. 3 is an example of a code which can be imprinted on the document of FIG. 2 by the system of FIG. 1 in accordance with the invention.

While any code pattern could be utilized, the exemplary unique identifying code 27 is a series of binary coded decimal numbers. For example, as shown in FIG. 3 such binary coded decimal numbers can be represented in columns having rows indicating by dots the powers of 2 which make up the number represented by that column. Thus, for the representative number 607958, the six is represented by the left most column with dots 29 in the two row and four row. An odd parity check sum column, CK, to the right of the least significant number provides a measure of reliability in reading the code. Preferably, a error correcting code can be used.

An example of a simple error correcting code is shown in FIG. 3. In addition to the odd parity check sum column, CK, an odd parity check sum row, RW, can also be provided in the unique identifying code pattern. Assume for purposes of illustration that the detected pattern has an error in that a dot 29' is erroneously detected in the first power of two row for the right hand column so that the detected least significant digit is 9 rather than 8. In this instance, the first power of two row odd parity check computed by the scanner from the detected pattern will not agree with that printed in the detected pattern. In addition, the parity check for the right-hand column will also not check in that a dot is found in the right-hand column odd parity check while the detected dot pattern would predict a 0 in this column. Hence, the row and column parity bits which intersect at the first power of two location in the least significant bit indicate that this dot 29' is an error and should not be there. Thus, the scanner can correct the detected code. If multiple dots are in error, such as could occur if the unique identifying code pattern overlaps printed matter selected by the program, it may not be possible to correct the code. However, with the multiple replications of the code, similarities between detected patterns can be used to verify the code. In its simplest form, if two patterns are the same, the code is verified.

Figure 4:
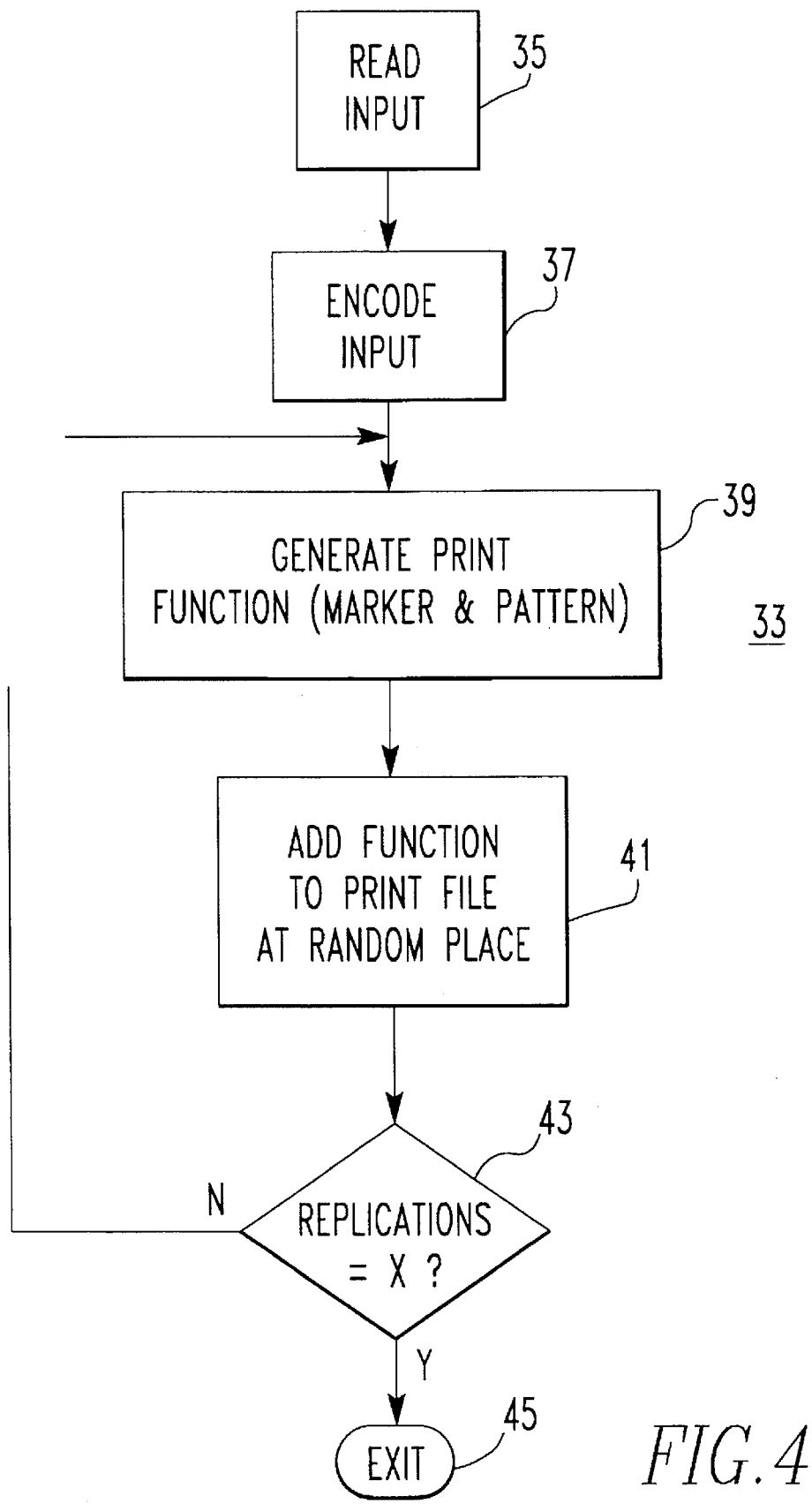
FIG. 4 is a flow chart of a routine used to generate a print file used by the system of FIG. 1 in accordance with the invention.

If the replications 27 of the unique identifying code are always placed in the same location on the document, the scanner 21 can be programmed to interrogate those locations. However, if the locations of the unique identifying code 27 are random, or vary with different manufacturers or programs, each replication of the code can be preceeded by a marker such as the symbol 31 shown in FIG. 3 to indicate to the scanner the beginning of a replication of the unique identifying code pattern. Of course, any other symbol can be used as the marker to indicate the location of the unique identifying code patterns.;

The unique identifying code pattern 27 with the marker 31, if provided, is placed in the print file by a routine 33 such as that illustrated by the flow chart of FIG. 4. The routine reads the input of the "invisible signature" at 35. For instance, in the pattern illustrated in FIG. 3 the program would read the number "607,958". The signature is then encoded, for instance in binary coded decimal, at 37. A print function for the binary coded decimal pattern plus the marker (such as 31 shown in FIG. 3) is then generated at 39. This print function contains commands, for instance in the postscript language where the print fie is in postscript, telling the printer how to print the desired pattern and marker. Each time the print file is generated by the software for printing a document, the print function generated at 39 is inserted into the print file. In the exemplary routine, the unique identifying code pattern is inserted at random into the print file. While this command is inserted at random into the print file it could be printed at a fixed location in the document depending upon the command. The printer when reading the print file sorts out the various commands and arranges them in order for printing on the document. In the example, multiple replications of the unique identifying code pattern 27 are inserted in the document, hence, the routine loops back at 43 until all replications have been inserted into the print file. The routine is then exited at 45.

The unique identifying code pattern or "invisible signature" can be added to any document produced by a Specific software. This will make it possible to detect the particular software copy that produced the document by checking the hard copy itself. As access to a document Should be much easier than to the computer on which the software produced it resides, :,it will become easier to identify software pirates. If a producer of software suspects that someone has an unauthorized copy of its software, it could send an inquiry to the user which would require a response using the software, such as, for example a letter. The letter could then be scanned with a high resolution scanner to extract the unique identifying code pattern which could then be checked against the registered owner of that copy of the software. If the sender of the document is not the registered owner, then an investigation could be made into how the user gained access to the program copy used. The invisible signature will be reproduced by copying of the document using a copier of reasonable quality. In fact, depending upon the quality of the copier, even copies of the copies should retain the signature. After several generations of copies on a good printer or even the first copy of a printer with poor resolution, the "invisible signature" will probably be degraded to the point that it could not be extracted by scanner, but then again, the overall quality of the document will also be seriously degraded.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of identifying a software copy used to generate documents comprising the steps of:

embedding in said software a unique identifying code pattern to be printed in addition to matter selected for printing by said software;

generating a printed document containing said unique identifying code pattern and said matter Selected for printing by said software, said unique identifying code pattern comprising a plurality of non-contiguous marks, each having a size no greater than about 300 dpi; and scanning said document to extract and identify said unique identifying code pattern.

2. The method of claim 1 wherein said step of generating a printed document comprises generating said document with multiple replications of said unique identifying code pattern spaced apart over said document.

3. The method of claim 2 wherein said step of scanning said document comprises extracting said multiple replications of said unique identifying code pattern.

4. The method of claim 3 wherein said scanning step comprises identifying said unique identifying code pattern replication based upon predetermined similarity of said multiple replications of said unique identifying code pattern.

5. The method of claim 4 wherein said predetermined similarity is established when at least two of said replications of said unique identifying pattern code are the same.

6. The method of claim 1 wherein said step of generating the printed document comprises printing said unique identifying code pattern as a pattern of single non-contiguous dots each having a size no greater than 300 dpi.

7. The method of claim 1 wherein said step of generating said document comprises printing said document with a printer having a resolution greater than about 300 dpi with each mark comprising contiguous dots which collectively have a size no greater than about 300 dpi.

8. The method of claim 1 wherein said unique identifying code pattern embedded in said software comprises a plurality of binary coded decimal numbers.

9. The method of claim 1 wherein said software generates a print file containing commands for printing and said step of embedding comprises embedding commands in said print file for generating said unique identifying code pattern, and wherein generating said document comprises implementing said commands to generate said unique identifying code pattern with a printer having a resolution at least as great as about 300 dpi.

10. The method of claim 9 wherein multiple replications of said unique identifying code are printed by said printer in spaced relation on said document.

11. A system for identifying a software copy used to generate a document comprising:

a software copy having embedded therein instructions for creating a unique identifying code comprising a plurality of non-contiguous marks each having a size no greater than about 300 dpi;

a digital computer for running said software;

user input means for controlling running of said software in said digital computer to select matter to be printed in addition to said unique identifying code pattern;

a high resolution printer having a resolution of at least 300 dpi for printing a document containing said matter selected to be printed and said unique identifying code pattern; and scanning means for extracting from said document said unique identifying code pattern.

12. The system of claim 11 wherein said high resolution printer prints multiple replications of said unique identifying code pattern spaced apart on said document, and wherein said scan means extracts said multiple replications of said unique identifying code pattern from said document.

13. The system of claim 11 wherein said software has a print file containing print commands for printing said matter selected for printing and for printing said unique identifying Code pattern, and wherein said high resolution printer executes said print commands to generate said document with said matter selected and said unique identifying code pattern.

14. The system of claim 11 wherein said unique identifying code pattern printed by such high resolution printer is a plurality of binary coded decimal numerals.

15. A method of identifying a medium used to generate an image, comprising the steps of:

employing said medium to generate said image incorporating a unique identifying code pattern of non-contiguous marks, with each of said marks having a size no greater than about 300 dpi; and scanning said image to extract and identify said unique identifying code pattern.

16. The method of claim 15 wherein said medium is employed to generate said image incorporating multiple replications of said unique identifying code pattern spaced apart in said image, and said step of scanning includes extracting and identifying said multiple replications of said unique identifying code pattern.

17. The method of claim 16 wherein said step of scanning includes extracting said multiple replications of said unique identifying code pattern and identifying said unique identifying code pattern in response to a predetermined similarity of the multiple replications of said unique identifying code pattern extracted.

18. The method of claim 15 wherein said unique identifying code pattern comprises a plurality of binary coded decimal numerals.

* * * * *

UNITED STATES PATENT AND TRADEMARK OFFICE
CERTIFICATE OF CORRECTION

PATENT NO. : 5,568,550
DATED : October 22, 1996
INVENTOR(S) : Shmuel Ur

It is certified that error appears in the above-indentified patent and that said Letters Patent is hereby corrected as shown below:

Column 1, line 17, "Coy" should be --by --.

Column 1, line 39, ":" should be deleted.

Column 2, line 40, ":" should be deleted.

Column 2, line 63, -- . -- should be inserted after "invention".

Signed and Sealed this

Eighteenth Day of November 1997

Attest:

BRUCE LEHMAN

Attesting Officer

Commissioner of Patents and Trademarks